US009840136B2

(12) United States Patent
Smith et al.

(10) Patent No.: US 9,840,136 B2
(45) Date of Patent: Dec. 12, 2017

(54) TONNEAU COVER AND METHOD OF ATTACHMENT

(71) Applicant: Lund Motion Products, Inc., Buford, GA (US)

(72) Inventors: Anthony Smith, Huntington Beach, CA (US); Dean Mettler, Sturgis, MI (US)

(73) Assignee: Lund Motion Products, Inc., Buford, GA (US)

( * ) Notice: Subject to any disclaimer, the term of this patent is extended or adjusted under 35 U.S.C. 154(b) by 0 days.

(21) Appl. No.: 15/154,594

(22) Filed: May 13, 2016

(65) Prior Publication Data
US 2017/0087968 A1   Mar. 30, 2017

Related U.S. Application Data

(63) Continuation of application No. 14/531,950, filed on Nov. 3, 2014, now Pat. No. 9,346,344.

(60) Provisional application No. 62/034,089, filed on Aug. 6, 2014.

(51) Int. Cl.
*B60J 7/19* (2006.01)
*B60J 7/16* (2006.01)
*B60J 7/10* (2006.01)
*F16M 13/02* (2006.01)
*F16B 7/04* (2006.01)

(52) U.S. Cl.
CPC ............. *B60J 7/198* (2013.01); *B60J 7/102* (2013.01); *B60J 7/106* (2013.01); *B60J 7/1607* (2013.01); *F16B 7/044* (2013.01); *F16M 13/02* (2013.01)

(58) Field of Classification Search
CPC . B60J 7/102; B60J 7/1607; B60J 7/106; B60J 7/04; B60J 7/02; F16M 13/02
USPC ............ 296/100.01, 100.02, 100.11, 100.17, 296/100.18, 136.03
See application file for complete search history.

(56) References Cited

U.S. PATENT DOCUMENTS

| | | | |
|---|---|---|---|
| 5,540,475 A | 7/1996 | Kersting | |
| 5,984,379 A | 11/1999 | Michel et al. | |
| 6,076,881 A | 6/2000 | Tucker | |
| 7,258,387 B2 | 8/2007 | Weldy | |
| 7,334,830 B2 | 2/2008 | Weldy | |
| 7,513,543 B2 | 4/2009 | Erskine | |
| 7,628,442 B1 | 12/2009 | Spencer et al. | |
| 7,823,957 B2 * | 11/2010 | Williamson | B60J 7/104 292/256 |
| 7,905,536 B2 | 3/2011 | Yue | |
| 8,146,982 B2 | 4/2012 | Williamson et al. | |
| 8,366,173 B2 * | 2/2013 | Xu | B60J 7/104 248/229.12 |
| 8,480,154 B2 | 7/2013 | Yue | |
| 8,678,459 B1 | 3/2014 | Win | |
| 2003/0057726 A1 | 3/2003 | Wheatley | |
| 2006/0208524 A1 | 9/2006 | Brown et al. | |
| 2008/0231073 A1 | 9/2008 | Essig | |

(Continued)

*Primary Examiner* — Jason S Morrow
*Assistant Examiner* — E Turner Hicks
(74) *Attorney, Agent, or Firm* — Knobbe Martens Olson and Bear LLP

(57) ABSTRACT

A tonneau cover and a method of attachment are disclosed herein. In some embodiments, a self-energizing clamp can be used to retain a tonneau cover onto a side wall of a truck bed, or other vehicle bed. In some embodiments, the clamp can be rotated between a usage position and a storage position in order to prevent the clamp from incidental movement or harm while accessing the truck bed.

17 Claims, 16 Drawing Sheets

(56) References Cited

U.S. PATENT DOCUMENTS

| | | | | |
|---|---|---|---|---|
| 2010/0270824 A1* | 10/2010 | Yue | ............... | B60J 7/198 296/100.07 |
| 2013/0015678 A1* | 1/2013 | Williamson | ............ | B60J 7/1607 296/100.09 |
| 2013/0341956 A1* | 12/2013 | Garska | .................. | B23P 11/00 296/100.16 |

* cited by examiner

TONNEAU COVER AND METHOD OF ATTACHMENT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

SUMMARY

Disclosed herein are embodiments of a bow hanger for a tonneau cover comprising a hanger portion, the hanger portion comprising a first attachment portion configured to associate with a tonneau cover, a connecting section attached to the first attachment portion, a second attachment portion, the second attachment portion positioned opposite of the first attachment portion from the connecting section, the second attachment portion attached to the connecting section, and a clamp portion, the clamp portion comprising a body portion configured to retain the hanger portion, a hinge mechanism connected to the body portion, a retaining mechanism associated with the hinge mechanism, said retaining mechanism positioned to exert a clamping force when said clamp is in at least one clamping position and to relieve said clamping force when said clamp portion is in at least one release position, and an actuator configured to move said hinge mechanism between said at least one clamping position and said at least one release position.

In some embodiments, the first and second attachment portions can be connected to each other. In some embodiments, the retaining mechanism can comprise a flexible end. In some embodiments, the hanger portion can be configured to rotate relative to the body portion.

In some embodiments, the bow hanger can further comprise a locking mechanism to secure the clamp portion relative the hanger portion so that said clamp portion remains in a storage position.

In some embodiments, the second attachment portion can be configured to attach to a rail, and wherein the clamp portion is configured to releasably secure the rail to a truck bed.

In some embodiments, the handle can comprise a guard portion to prevent a user from injury. In some embodiments, the retaining mechanism can be adjustable. In some embodiments, the retaining mechanism can be adjusted by a stair-shaped mechanism.

In some embodiments, the hinge mechanism can comprise four rotating links comprising a ground link, two grounded links, and one floating link. In some embodiments, the grounded links can rotate though a limited range of angles which does not include 0° or 180°. In some embodiments, the hinge mechanism can comprise a beginning hinge point, a middle hinge point, and an end hinge point, wherein the middle hinge point is located off-line from a line between centers of the beginning and end hinge points.

In some embodiments, the retainer mechanism can comprise three hinge sections which pivotably receive two mating hinge sections defined by the body portion.

Also disclosed herein are embodiments of a tonneau cover assembly comprising a tonneau cover at least one rail, and at least one bow hanger, the bow hanger being associated with the tonneau cover and the at least one rail, the bow hanger comprising a hanger portion, the hanger portion comprising a first attachment portion configured to associate with a tonneau cover, a connecting section attached to the first attachment portion, a second attachment portion configured to associate with the at least one rail, the second attachment portion positioned opposite of the first attachment portion from the connecting section, the second attachment portion attached to the connecting section, and a clamp portion, the clamp portion comprising a body portion configured to retain the hanger portion, a hinge mechanism connected to the body portion, a retaining mechanism associated with the hinge mechanism, said retaining mechanism positioned to exert a clamping force when said clamp is in at least one clamping position and to relieve said clamping force when said clamp portion is in at least one release position, and an actuator configured to move said hinge mechanism between said at least one clamping position and said at least one release position.

In some embodiments, the cover can be a soft cover. In some embodiments, the cover can be a hard cover.

In some embodiments, the hinge mechanism can comprise four rotating links comprising a ground link, two grounded links, and one floating link. In some embodiments, the grounded links can rotate though a limited range of angles which does not include 0° or 180°. In some embodiments, the hinge mechanism can comprise a beginning hinge point, a middle hinge point, and an end hinge point, wherein the middle hinge point is located off-line from a line between centers of the beginning and end hinge points.

Also disclosed herein are embodiments of a truck having a truck bed comprising at least one rail located on the inside of the truck bed, the rail extending generally from a back end of the truck bed to a front end of the truck bed, and at least one bow hanger configured to moveably attached to the at least one rail and configured to associate with a tonneau cover, the bow hanger comprising a hanger portion, the hanger portion comprising a first attachment portion configured to associate with a tonneau cover, a connecting section attached to the first attachment portion, a second attachment portion configured to associate with the at least one rail, the second attachment portion positioned opposite of the first attachment portion from the connecting section, the second attachment portion attached to the connecting section, and a clamp portion, the clamp portion comprising a body portion configured to retain the hanger portion, a hinge mechanism connected to the body portion, a retaining mechanism associated with the hinge mechanism, said retaining mechanism positioned to exert a clamping force when said clamp is in at least one clamping position and to relieve said clamping force when said clamp portion is in at least one release position, and an actuator configured to move said hinge mechanism between said at least one clamping position and said at least one release position.

DETAILED DESCRIPTION

Disclosed herein are embodiments of covers, attachment systems for covers, and methods of attaching a cover to the bed of, for example, a truck. In some embodiments, the covers can be tonneau covers, as discussed in detail below, but the type of cover does not limit the disclosure.

In some embodiments, hangers, such as bow hangers, can be used to attach a tonneau cover, or tonneau, to a bed of a pickup truck. The tonneau cover can be hard or soft, or a mixture of hard portions and soft portions. The relative rigidity of the tonneau cover does not limit the disclosure. In some embodiments, the cover can be reduced in size by folding or hinging for a hard cover, and rolling for a soft cover, though the method of reduction does not limit the disclosure. Therefore, the cover can extend over the length of the truck bed, or can be compacted into a storage position, thereby revealing the contents of the truck bed for a user to more easily access. Because the tonneau cover can completely cover a truck bed, the tonneau cover can be used, for example, to prevent sun or other environmental damage to cargo. Further, in some embodiments the tonneau cover can be locked onto the truck bed, such as on the gate of the truck bed, thereby increasing security of any cargo by preventing others from accessing a truck bed that is typically open without the tonneau cover.

Figure 1:
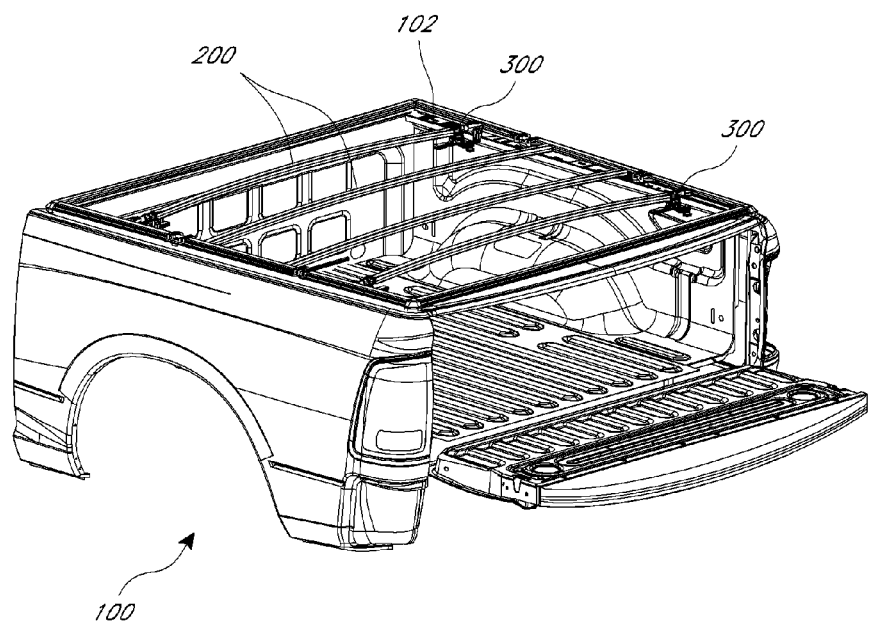
FIG. 1 illustrates a truck bed having an embodiment of a tonneau cover and bow hanger.
Figure 2:
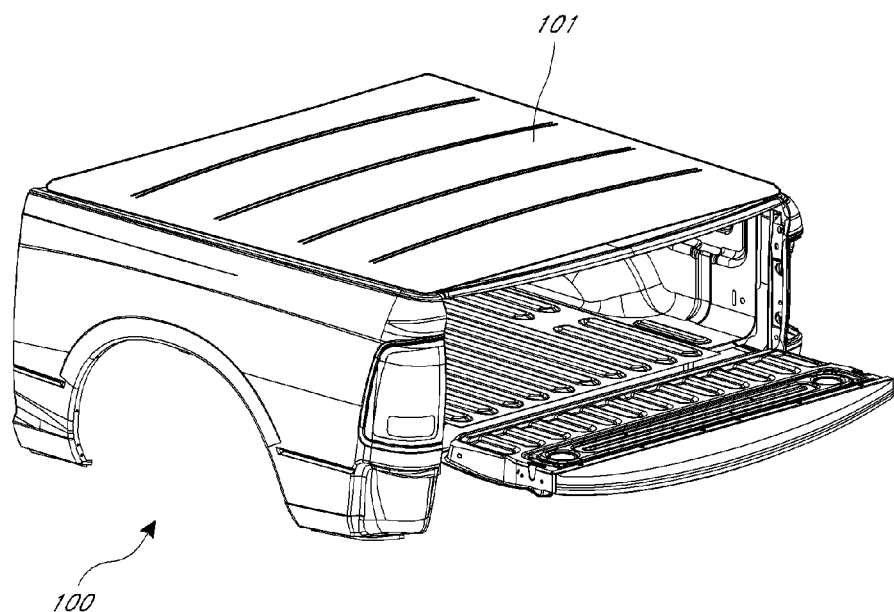
FIG. 2 illustrates a truck bed having an embodiment of a tonneau cover and bow hanger.

FIG. 1 shows a bed 100 of a truck which can be covered with a tonneau cover (the covered truck bed 100 shown in FIG. 2). A series of rails 102 can be located on and can extend across the open top of the truck bed 100. The rails 102 can be permanently attached to the bed 100, or can be removable from the bed 100. As discussed in detail below, the rails 102 can be attached on the truck bed 100 through the use of bow hanger and clamp assemblies 300. In some embodiments, the truck bed 100 can have generally parallel rails 102 along the length of the bed 100. There can be 2, 3, 4, 5, 6, 7, 8 or more rails 102 and the number of rails 102 does not limit the disclosure. Below the rails 102 is a generally flat surface of the truck bed 100 which runs generally parallel to the bottom of the truck bed 100, this surface having a bottom lip 702 as discussed below.

Bows 200 can be located at the edges of segmented sections found in hard tonneau covers, though soft tonneau covers can be used as well. The bows 200 can be associated with bow hanger and clamp assemblies, or bow hangers, 300. The bows 200 can be removably attached to the hanger 300. These hangers 300 can be used to attach the rails 102 to the sides of a truck bed 100. Further, the hangers 300 can attach a tonneau cover, through the use of bows 200 to the rails 102, thus attaching the tonneau cover to the truck bed 100. FIG. 2 illustrates a truck bed 100 with a cover 101 over the bows 200. As shown, the cover 101 can be associated with the bows 200, thus allowing the cover 101 to provide a covering for the bed 100.

Figure 3:
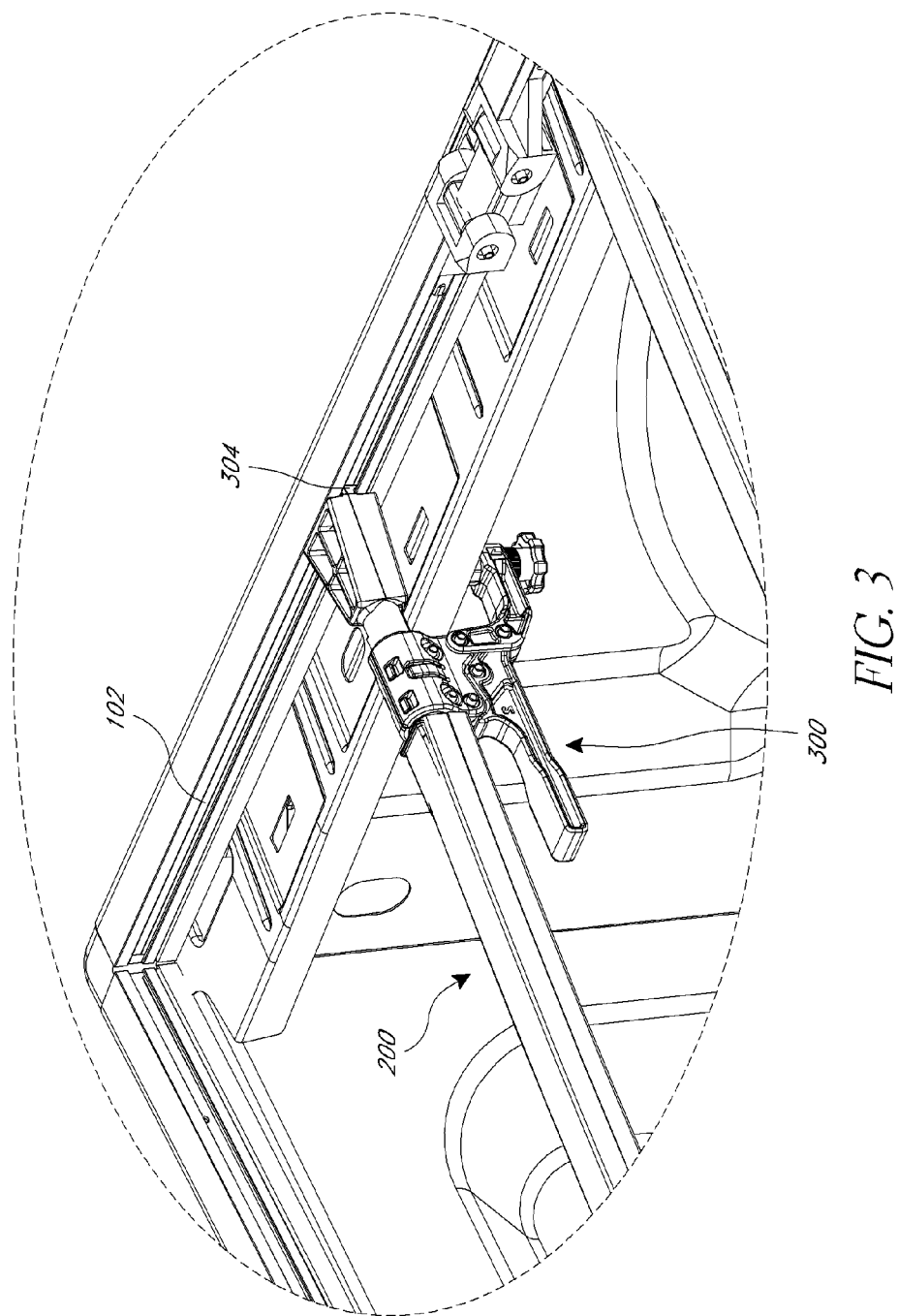
FIG. 3 illustrates an embodiment of a bow hanger inserted into a rail system.

As discussed in detail below, in some embodiments the bow hangers 300 can be associated with and generally retained in the rails 102. This can be seen in FIG. 3 and, as shown, the bow hanger 300 can contain a guide 304, being generally T-shaped in some embodiments, which inserts into the rails 102. The guide 304 can be generally a stem with a double flange member, though it could be other shapes as well and the shape does not limit the disclosure. When in the open configuration, the guide 304 can slide within the internal structure of the rail 102.

Figure 4:
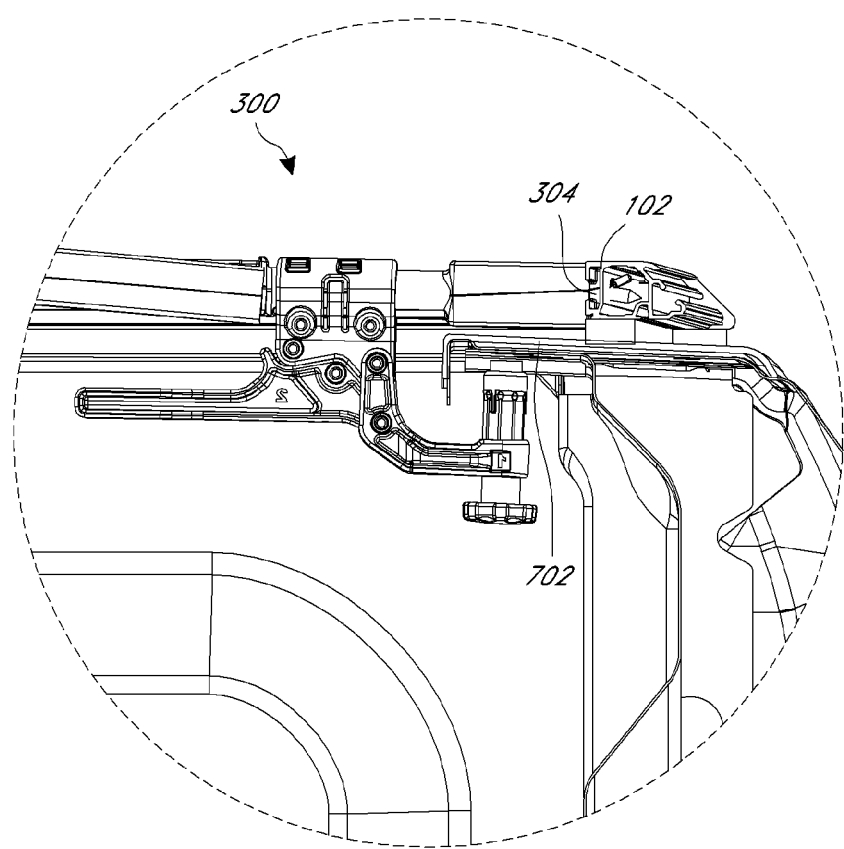
FIG. 4 illustrates a side view of the attachment of an embodiment of a bow hanger to a truck bed.

FIG. 4 illustrates an embodiment of a bow hanger 300 in a closed configuration attached to a truck bed 300. As shown, guide 304 can be inserted into rail 102, thereby preventing or hindering movement of the bow hanger 300 in all directions other than in parallel with the direction of the rail 102 so that the guide 304 slides within the rail 102. To stabilize the bow hanger 300, and thus the tonneau cover, the bow hanger 300 can be closed, thus putting a generally vertical force on the underside of a lip 702 of the truck bed 100. By closing the bow hanger 300, the rails 102, which can contain no other attachment mechanism to the truck bed 100, can be mechanically attached to the truck bed 100. Therefore, the bow hanger 300 can remain in place on the rail 102 in the closed configuration. In some embodiments, after the bow hanger 300 is inserted into the rail 102 at a certain position, the bow hanger 300 may be mechanically fastened to the rail 102 so that the hanger 300 does not move relative to the rail 102, but the rail 102 can still move relative to the truck bed 100.

In some embodiments, a plurality of bow hangers 300 can be used on the truck bed 100. In some embodiments, 1, 2, 3, 4, 5, 6, 7, or more bow hangers 300 can be used on each side of the truck bed 100. In some embodiments, greater than 1, 2, 3, 4, or 5 bow hangers 300 can be used on each side of the truck bed 100. In some embodiments, less than 2, 3, 4, 5, 6, or 7 bow hangers 300 can be used on each side of the truck bed 100. The number of hangers 300 used does not limit the disclosure. In some embodiments, the same number of bow hangers 300 can be used on each side of the truck bed 100. In some embodiments, a different number of bow hangers 300 can be used on each side of the truck bed. In some embodiments, each bow hanger 300 can be associated with a portion of the tonneau cover. In some embodiments, not every bow hanger 300 is associated with a portion of the tonneau cover.

In some embodiments, the bow hangers 300 can be movable along the rail 102 when in an opened position. When in the closed position, the bow hangers 300 can be locked in a stationary where a user locks the bow hangers 300.

Bow Hanger

FIGS. 5-12 illustrate different viewpoints of an embodiment of a bow hanger 300. The bow hanger 300 can be formed with different attachment members, a rail attachment member 302 to attach to the rail 102 and a bow attachment member 308 to attach to at least one of the bows 200. The bow hanger desirably also includes, a clamp portion 309 which can be made up of the body 306, handle 310, pivot arm 510, and clamp engagement mechanism 312, though other parts can be used as well and the described parts do not limit the disclosure. The clamp portion can be associated with members 302/308, which can be used to fix the bow hanger 300 (and thus the bow 200) to the rail 102.

Figure 5:
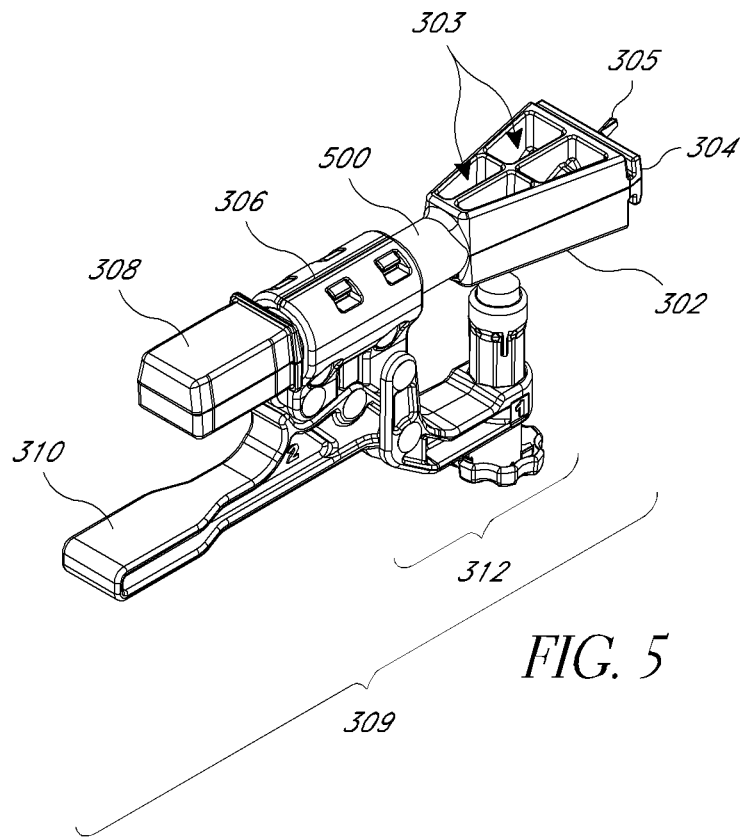
FIGS. 5-12 illustrate viewpoints of an embodiment of a bow hanger for a tonneau cover.

As shown in FIG. 5, the first attachment member 302 can be used to attach to rails 102 sitting on a truck bed 100. The attachment member 302 can be shaped generally like a triangular prism, though other shapes can be used as well and the shape of the attachment member 302 does not limit the disclosure. For example, the attachment member 302 can be rectangular shaped, square shaped, or irregularly shaped. In some embodiments, the attachment member 302 can contain hollow portions 303 extending through the attachment member 302, as shown in FIG. 5. These hollow portions 303 can reduce the overall weight of the attachment member 302, while still retaining stability. In some embodiments, the attachment member 302 can be solid and not contain the hollow portions 303. In some embodiments, the attachment member 302 can contain a guide 304 configured to slide within the rails 102 of the truck bed 100, thus allowing the bow hanger 300 to slide along the plane of the rail 102.

In some embodiments, attachment member 302 can have a self tapping screw 305 extend through it. As shown, the head of the self tapping screw 305 can be located within the body of attachment member 302, for example through an aperture, and the screw portion can extend away from the attachment member 302 in the direction of guide 304. In some embodiments, the screw 305 can extend through guide 304. Therefore, when the bow hanger 300 is located on a desired position on the rail 102, the self tapping screw 305 can be tightened to mechanically attach the bow hanger 300 to a fixed position with respect to the rail 102. In some embodiments, the self tapping screw 305 can extend from the attachment member 302 to relatively permanently attach the attachment member 302 to a rail 102. In some embodiments, the self tapping screw 305 can be removed from a rail 102.

At the end opposite the guide 304, the attachment member 302 can be retained within a body 306. In some embodiments, the attachment member 302 can be attached to a connecting member 500 which can be inserted into a retaining body 306. In some embodiments, connecting member 500 can be cylindrical, though the shape does not limit the disclosure. The body 306 can be shaped to accept the connecting member 500, though the shape of the body 306 does not limit the disclosure. In some embodiments, the connection member 500 can move along the axis of the bow 200 and the body 306, as shown by the arrow in FIG. 10. The connection member 500 can then be locked in place in the body 306, as discussed below. This can allow for flexibility in the clamping position, and allows for ease in rotating to the stow position, as discussed below.

As mentioned, the end of the attachment member 302 inserted into the body 306 can be sized and shaped to be retained within the body 306. The attachment member 302 can extend out at different lengths from the retaining body 306, allowing for attachment to different truck beds 100. In some embodiments, the attachment member 302 can be movable in and out of the body 306. In some embodiments, in order to increase the length, the attachment member 302 can be removed and a longer or shorter member could be inserted into the retaining body 306. In some embodiments, different lengths of attachment member 302 can be used at different locations of the truck bed 100.

In some embodiments, the body 306 can be formed from two different pieces. The two pieces can be attached by an attachment element, such as with rivets 307, shown in FIG. 9. However, the attachment mechanism does not limit the disclosure. In some embodiments, the body 306 can be opened. In some embodiments, the two body pieces can be permanently attached to one another. By having the two pieces, manufacturing of the body 306 can be made easier.

Generally opposite attachment member 302 can be second attachment member 308. This member 308 can be configured to attach to a tonneau cover. For example, the member 308 can be sized and configured to fit within hollow spaces in the bows 200 of a hard tonneau cover. However, the method of attachment of the bow hanger and the tonneau cover does not limit the disclosure, and any attachment means can be used. In some embodiments, the member 308 can be shaped like a rectangular prism, though the shape does not limit the disclosure. Member 308 can be inserted and retained into body 306. In some embodiments, members 302/308 and connecting member 500 can be formed of a single piece, with the attachment member 302/308 being on the ends and a generally connecting member 500 attaching the ends.

In some embodiments, members 302/308 can each have a retaining mechanism for attachment to their respective rail 102 and bows 200. For example, the members 302/308 can have a locking mechanism to retain the members 302/308 in their respective location. In some embodiments, the members 302/308 can have and indent, dip, or slot, for example, that resists movement but can be overcome if sufficient force is applied.

Figure 9:
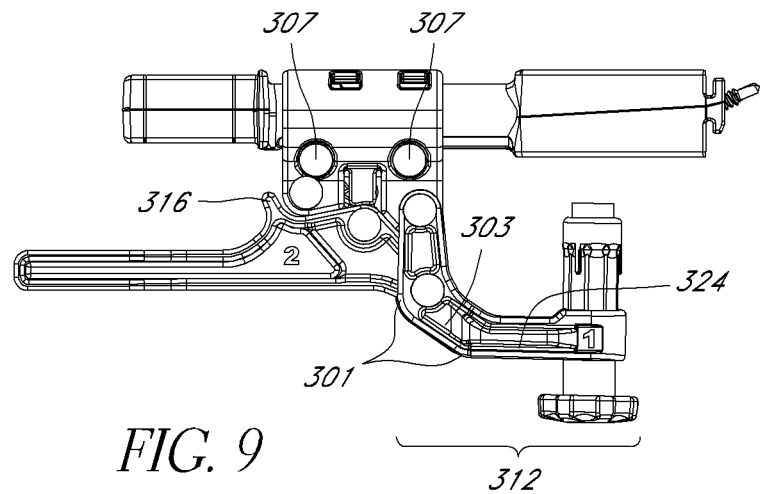

The body 306 can be attached to a handle 310 and clamp engagement mechanism 312. The handle can include a guard 316 configured to prevent insertion of a user's skin or fingers into any openings, thus reducing the incidence of damage to a user's fingers. The guard 316 can extend away from any joint on the bow hanger 300, such as the joint connecting the handle 310 to the body 306. In some embodiments, handle 310, in the closed position as shown in FIG. 9, can extend generally parallel to members 302/308. In some embodiments, the handle 310, in the closed position, can extend at an angle away from the axis of members 302/308. The angle does not limit the disclosure.

In some embodiments, the handle 310 can extend away from the body 306, thereby providing sufficient room for a user to grip and hold the handle 310. In some embodiments, the handle 310 can have a cushion, or other soft material, attached for a user to hold. In some embodiments, the handle 310 can be sized and shaped to easily fit within a user's hand. In some embodiments, the handle 310 can have a slip resistant surface, such as a rough surface or an attached increased friction surface, in order to reduce slippage by a user when operating the bow hanger 300.

Both the handle 310 and body 306 can be attached to a clamp engagement mechanism 312. The clamp engagement mechanism 312 can be generally L, or C-shaped in structure, though the particular shape does not limit the disclosure. In some embodiments, the corners of the L-shape can be generally rounded. In some embodiments, the corner of the L-shape can be formed of two different bends 301 and a connecting segment 303, as shown in FIG. 9, thereby forming a more rounded shape for the clamp engagement mechanism 312.

In some embodiments, the clamp engagement mechanism 312 can vary in thickness across its body. For example, the lower arm 324 can be thicker than the other parts of the arm, as the lower arm 324 can experience most of the load of the bow hanger during operation.

Figure 6:
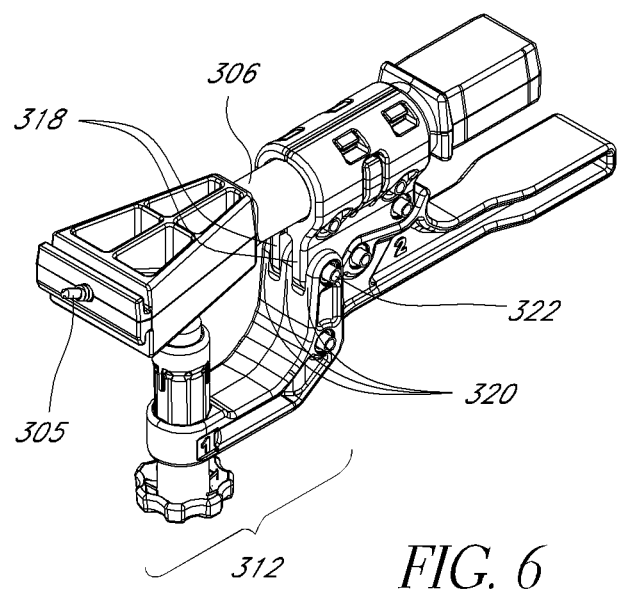
Figure 7:
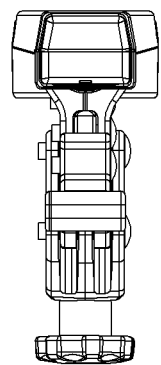
Figure 8:
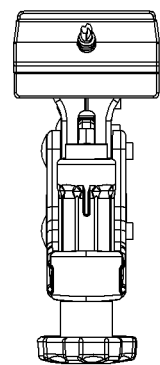
Figure 12:
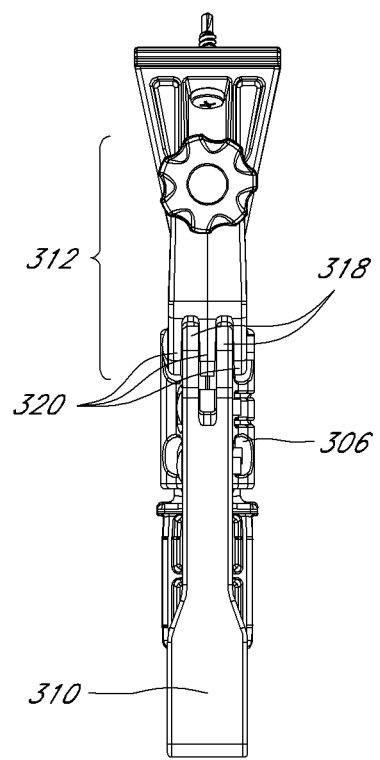

FIGS. 6 and 12 show an embodiment of a connection between the clamp engagement mechanism 312 and the body 306. As shown, the body 306 can have 2 segments 318 that fit within the gaps between 3 segments 320 of the clamp engagement mechanism 312. A connecting member 322 can then pass through the segments, thus allowing the clamp engagement mechanism 312 to rotate with respect to the body 306. This configuration can also prevent injury to a user if fingers were to be located in the area of the connection while the bow hanger 300 is being operating, as there is not sufficient space for fingers to be caught in the connection between the two parts. Further, by having the clamp engagement mechanism 312 be thicker than the body 306, more load can be applied to the clamp engagement mechanism 312.

Figure 10:
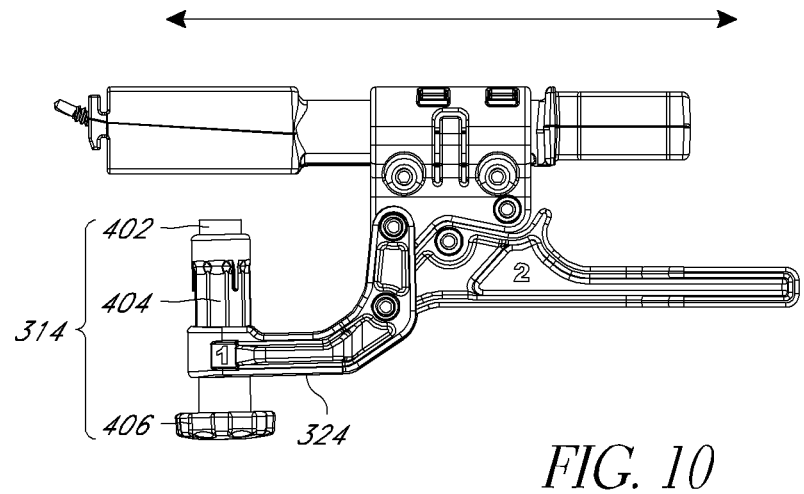
Figure 11:
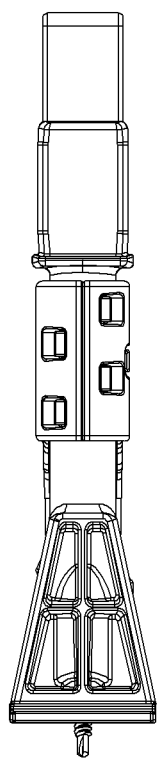

As shown in FIG. 10, at the end of the clamp engagement mechanism 312 generally opposite of attachment to the body 306, the lower arm 324 can have a rail retaining portion 314. The rail retaining portion can be made up of an engagement member, such as pad 402, a body 404, and a position adjustment member, such as screw 406, though other components can be used as well and the listed components do not limit the disclosure.

The pad 402 can be made of a generally flexible or pliable material. Therefore, when the pad 402 presses against the bottom of lip 702, it will not damage the lip 702. The pad 402 can mold or deform against the bottom of the lip 702 to give improved grip to the clamp engagement mechanism 312. Further, the pad 402 can be made of a slip resistant material, or can be coated by a slip resistant material, which can allow the pad 402 to remain in the desired position on the lip 702, even if some minimal forces were to act on the bow hanger 300. In some embodiments, the pad 402 can be generally circular, but the shape of the pad does not limit the disclosure, and square, triangular, or rectangular pads can be used as well.

The pad 402 can be located on and attached to a body portion 404, though the attachment mechanism does not limit the disclosure. The body portion 404 can be generally cylindrical, though the shape of the body portion 404 does not limit the disclosure. In some embodiments, the body 404 can be formed as a rectangular prism. The body portion 404 can be sized to fit within an aperture 802 (shown in FIG. 13) of the lower arm 324. In some embodiments, the aperture 802 can contain a mating mechanism with the lower portion of the body portion 404, thus preventing the body portion 404 from spinning in the aperture. In some embodiments, lower arm 324 doesn't have an aperture 802 and the body portion 404 can rest on the lower arm 324. Further discussion of the aperture 802 can be found below.

Below the lower arm 324, at the opposite side as the body portion 404, the rail retaining portion 314 can contain a screw 406. The screw 406 can be used to adjust the positioning of the body 404, and thus the pad 402. This can allow for different distances to separate the pad 402 from the bottom of attachment member 302, thereby allowing for attachment to different sized rails where the lip 702 can be located in different vertical configurations.

In some embodiments, the screw 406 can advance adjust the position of the pad by about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0 inches. In some embodiments, the screw can advance adjust the position of the pad by greater than about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0 inches. In some embodiments, the screw can advance adjust the position of the pad by less than about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0 inches. The distance of advancement by the screw 406 does not limit the disclosure.

Figures 13, 14:
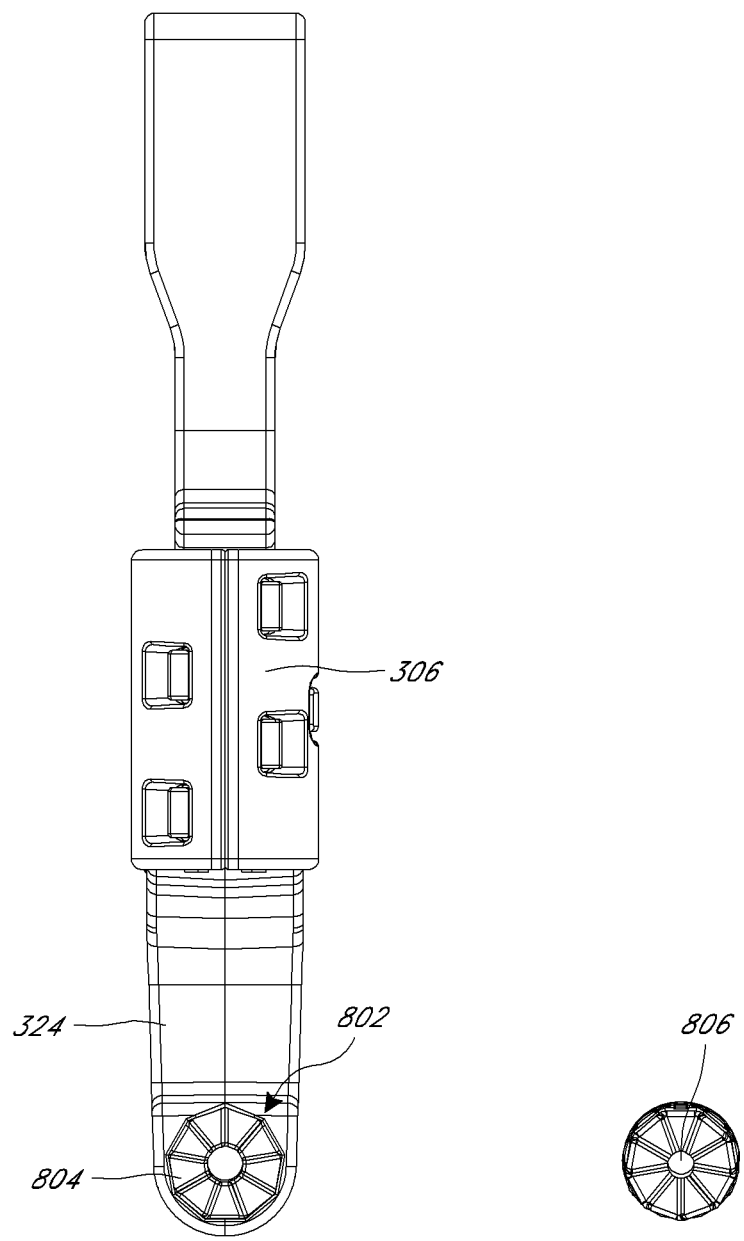
FIGS. 13-14 illustrate adjustment pieces for an embodiment of a bow hanger.

FIGS. 13-14 illustrate an embodiment of the bow hanger 300 having an aperture 802 defined by generally cylindrical mating portion 804 which is configured to accept generally cylindrical mating portion 806 of body portion 404. FIG. 13 shows a view of the lower arm 324 and FIG. 14 shows a view of body portion 404, the two views being in generally opposite direction. These mating portion 804 can be configured to mate with mating portion 806 located on the body portion 404, so that the mating portion 806 is inserted within mating portion 806. Once inserted, the body portion 404 can be locked in place at a respective position, though can be generally rotated upon loosening of screw 406.

In some embodiments, the mating portions 804/806 can have a generally stair shaped internal structure, as shown in FIGS. 13 and 14. Accordingly, the body portions 804/806 fit against one another in the stair shaped internal structure. Once the screw 406 is loosened, the body portion 404 can be rotated and moved to a different step in the internal structure, which can change the vertical position of the pad 402. The screw 406 can then be tightened, holding the body portion 404 in place. The stair step internal structure can also prevent the body portion 404 from rotating unless a user so desires. In some embodiments, the mating portions 804/806 can have 1, 2, 3, 4, 5, or 6 stairs. In some embodiments, the mating portions 804/806 can have greater than 1, 2, 3, 4, 5, or 6 stairs. In some embodiments, the mating portions 804/806 can have less than 2, 3, 4, 5, or 6 stairs.

Self-Energizing Clamp Engagement Mechanism

In some embodiments, the clamp engagement mechanism 312 can be self-energizing. For example, a planar four-bar linkage can be used in some embodiments, allowing for stability and predictability in clamping. In some embodiments, a planar quadrilateral linkage can be used for self-energizing the clamp engagement mechanism 312. In some embodiments, a planar quadrilateral crank-rocker linkage can be used, which is described below and shown in FIGS. 15A-C.

Figure 15A:
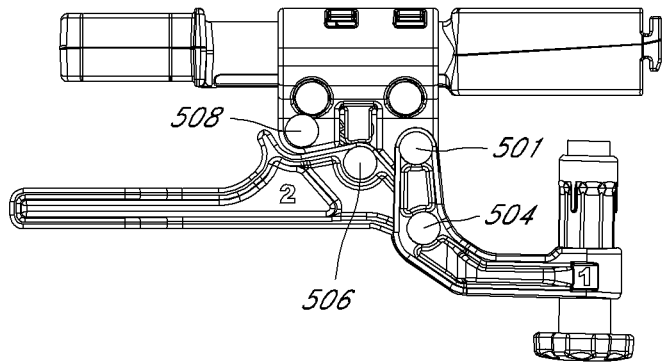
FIGS. 15A-C illustrate the opening/closing of an embodiment of a bow hanger for a tonneau cover.
Figure 15B:
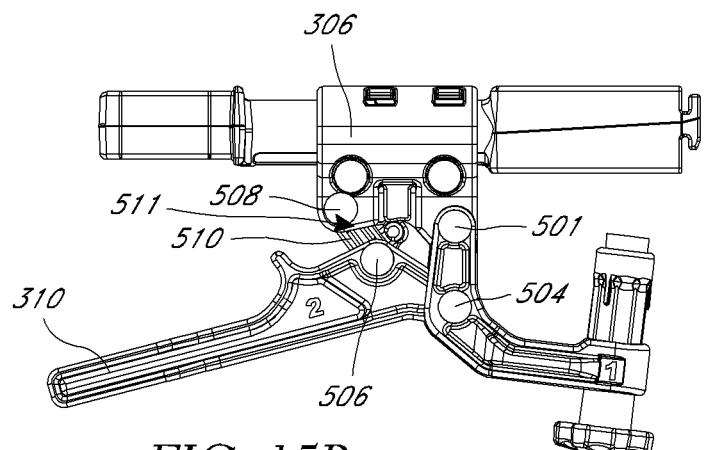
Figure 15C:
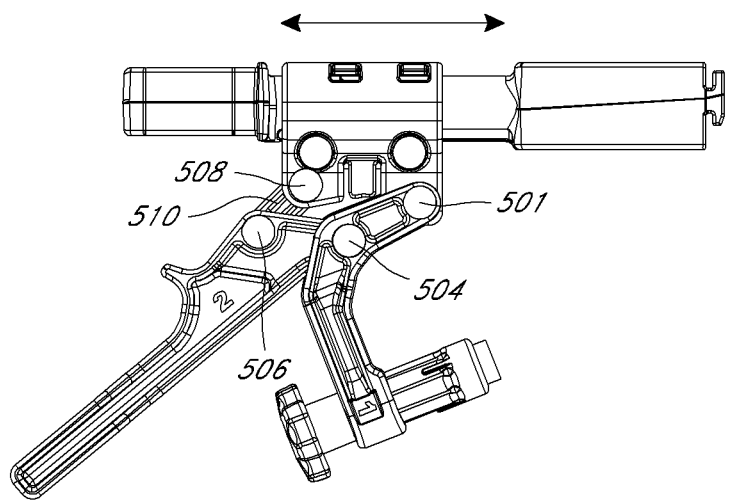
Figure 16:
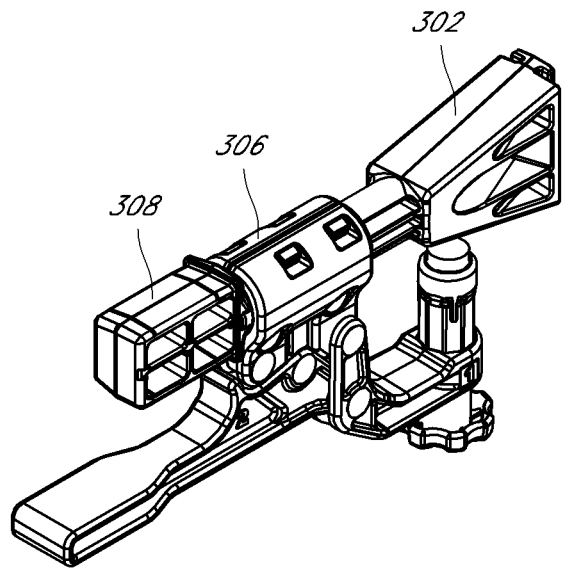
FIGS. 16-19 illustrate an embodiment of a bow hanger for a tonneau cover which is rotated from a clamping position.
Figure 17:
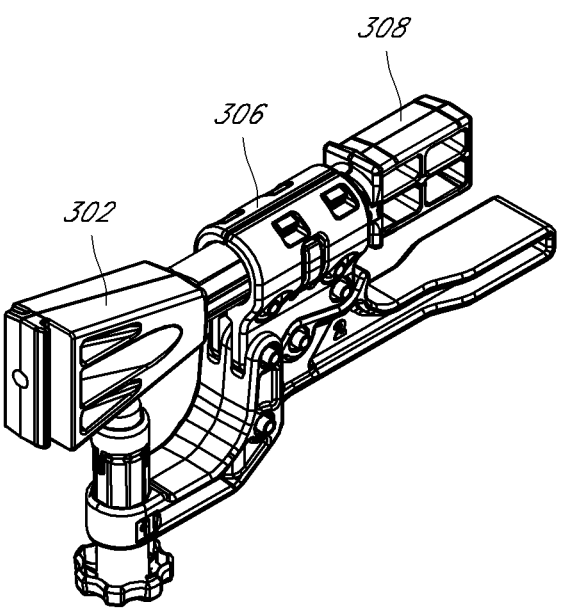
Figure 18:
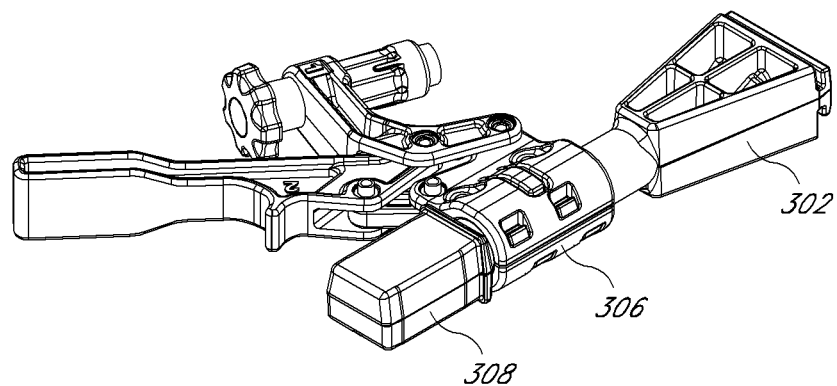
Figure 19:
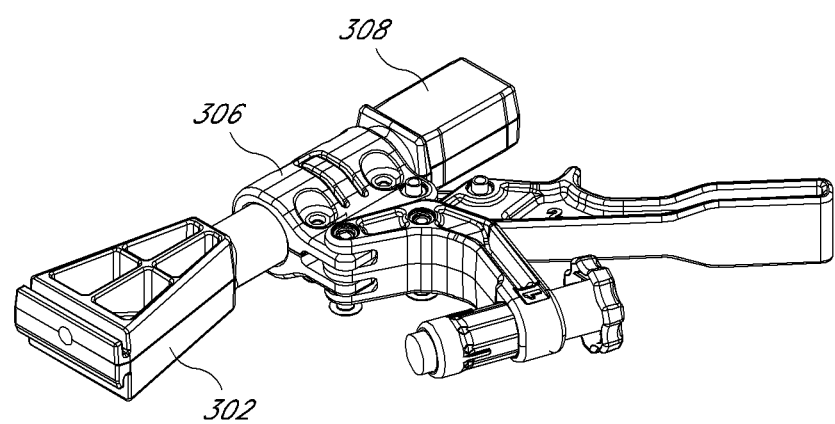

In the position shown in FIG. 15A, the clamp engagement mechanism 312 is in a self-energized position so that a load applied to the rail retaining portion 314 of the clamp engagement mechanism 312 does not move the clamp engagement mechanism 312 into the open position (as shown in FIG. 15C). For example, any force exerted downward onto the rail retaining portion 314 of the clamp engagement mechanism 312 desirably will increase the resistance of the clamp engagement mechanism 312 to opening. In some embodiments, the clamp engagement mechanism 312 would need to move upward in a direction opposite the force on the clamp engagement mechanism 312 before the clamp engagement mechanism 312 can open. Therefore, if the clamp engagement mechanism 312 experienced a large force, it would not pop open, which can be a significant problem for other bow hangers in use. However, application of force onto the handle 310 can open the clamp engagement mechanism 312.

In some embodiments, in the self-energized position there can be some slight rotational movement of the handle 310. For example, the handle can rotate approximately 0.5, 1, 2, 3, 4, or 5 degrees without opening the clamp engagement mechanism 312 or/or moving the clamp to a position where the clamp is not still self-energized. In some embodiments, the handle can rotate approximately less than 0.5, 1, 2, 3, 4, or 5 degrees without opening the clamp engagement mechanism 312 or/or moving the clamp to a position where the clamp is not still self-energized. This ensures that the clamp remains self-energized even if the clamp handle is bumped and/or moves somewhat.

FIGS. 15A-C illustrate the bow hanger 300 in the closed/locked (FIG. 15A), intermediate (FIG. 15B), and open (FIG. 15C) positions, thereby attaching the rail 102 to the truck bed 100.

As shown in FIG. 15A, the rail retaining portion 314 can be positioned approximately perpendicular to attachment member 302. This position can lock the bow hanger 300 in place on a rail 102, and can lock the rail 102 onto the lip 702. As discussed above, attachment member 302 can have different lengths, and thus the location of the rail retaining portion 314 relative to attachment member 302 can change based on the length of attachment member 302.

As shown in FIG. 15A, hinge 506 is located "off line" from hinges 502/504. Specifically, if a straight line was drawn between the centers of hinges 508/504, the center of hinge 506 would not be located on that line. In FIG. 15A, hinge 506 is shown to be slightly above that line. This can promote the self-energizing functionality of the bow hanger 300, as discussed below. Significantly, positions of the pivots of the clamp engagement mechanism 312 are positioned such that force acting on the pad 402 in a direction which would otherwise tend to open the clamp engagement mechanism 312, causes the portion of the handle 310 surrounding the hinge 506 to be forced against an abutment surface 511 of the body 306, which has the effect of "locking" the clamp engagement mechanism 312 in a clamped position.

It is not until the clamp engagement mechanism 312 has been moved to roughly to the position shown in FIG. 15B which is an intermediate position between opening and closing, where force acting on the pad 402 will tend to cause the portion of the handle 310 surrounding the hinge 506 to be rotated away from the body 306 tending to open the clamp engagement mechanism. As shown, the clamp engagement mechanism 312 can be attached to the body 306 through a hinge 501. Further, the clamp engagement mechanism 312 can be attached to the handle 310 through hinge 504. Further, handle 310 and the body 306 can be attached by a pair of hinges 506/508 that couple a pivot arm 510 between them.

As shown, the handle 310, clamp engagement mechanism 312, body 306, and pivot arm 510 all pivot with respect to one another, and no sliding is performed. In some embodiments, pivot arm 510 can act as an input link. In some embodiments, clamp engagement mechanism 312 can act as an output link. In some embodiments, one of the input/output links can spin all the way around, if not obstructed, and the other can rock back and forth through a given angular range. Further, the handle 310 can act as a floater link, which can drive the input link to a position where the rocker link just begins to rock back and further movement of the input is obstructed by the body of the linkage, which can be a self-energizing toggle point. The body 306 can act as the ground link (or fixed link). In some embodiments, the grounded links can rotate though a limited range of angles which does not include 0° or 180°.

FIG. 15C shows an embodiment of the bow hanger 300 in an open position. As shown, the clamp engagement mechanism 312 can be pulled away from attachment member 302, thus allowing for the rail 102 to be inserted between them. Once the bow hanger 300 is in the proper position on the rail 102, the user can apply a force (upward in FIG. 14C) onto the handle 310, thus closing bow hanger 300 onto the rail 102. This attaches the rail 102 to the truck bed 100. Also, as shown in FIG. 15C, the body 306 can be configured to move or slide along and independently of connecting member 500. This movement can facilitate avoidance of any objects in the storage position, and can facilitate attachment to the rail 102. The body 306 can be locked into a particular position on the connecting member 500, and can be unlocked to move along the connecting member 500. This can be done through a locking mechanism or through frictional forces, and the type of locking does not limit the disclosure.

Rotation Configuration

FIGS. 16-19 show an embodiment of the bow hanger 300 wherein members 302/308 can rotate within body 306. This can allow for the bow hanger 300 to be rotated out of the way into a stow position so that the bow hanger 300 is not damaged when the tonneau cover is removed and folded for storage, thereby making it less likely that the bow hanger 300 is damaged. In some embodiments, the body 306, handle 310, and clamp engagement mechanism 312 can be rotated to be generally parallel with the axis of the rail 102. In some embodiments, attachment member 302/308 can be rotated approximately 45, 50, 60, 70, 80, 90, 100, 110, 120, 130, 140, 150, 160, or 180 degrees in body 306. In some embodiments, attachment member 302/308 can be rotated less than approximately 45, 50, 60, 70, 80, 90, 100, 110, 120, 130, 140, 150, 160, or 180 degrees in body 306. In some embodiments, attachment member 302/308 can be rotated greater than approximately 45, 50, 60, 70, 80, 90, 100, 110, 120, 130, 140, 150, 160, or 180 degrees in body 306.

Figure 20:
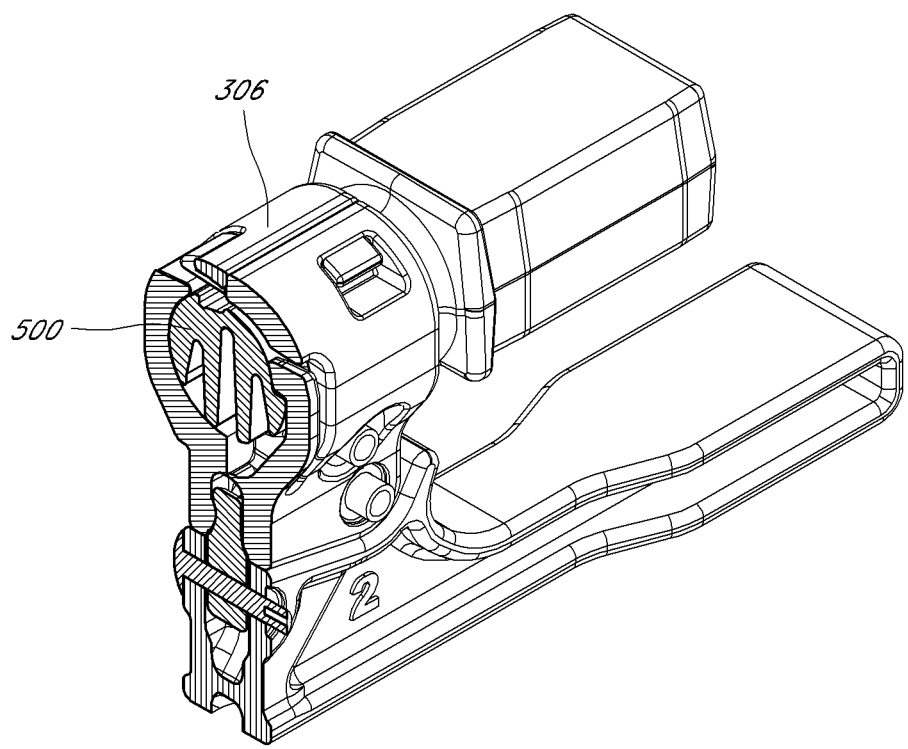
FIGS. 20-23 illustrate internal components of a rotation mechanism for embodiments of a clamp for a tonneau cover.

FIG. 20 illustrates an embodiment of the rotation mechanism of the body 306. The figure shows a cross section of the body 306 along the connecting member 500 which connects members 302/308.

Figure 21:
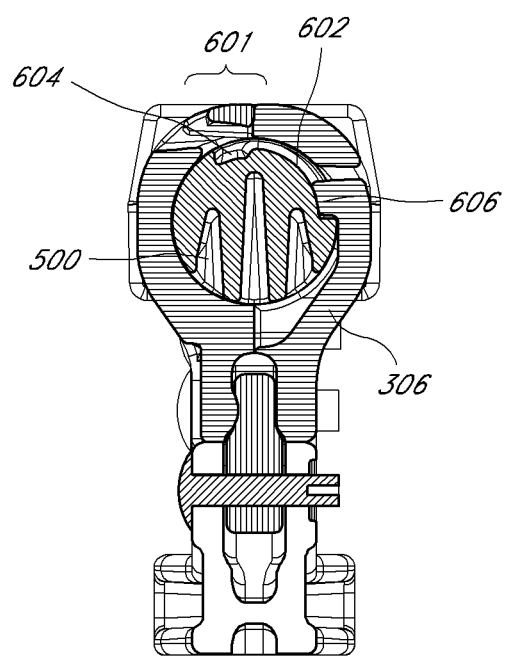

FIG. 21 illustrates another cross section of the body 306 along the connecting member 500 which connects members 302/308. This view shows that two different pieces of the body 306, as discussed above, can be attached by an engagement mechanism 601. Further, FIG. 21 shows member 308 inserted into bow 200.

Figure 22:
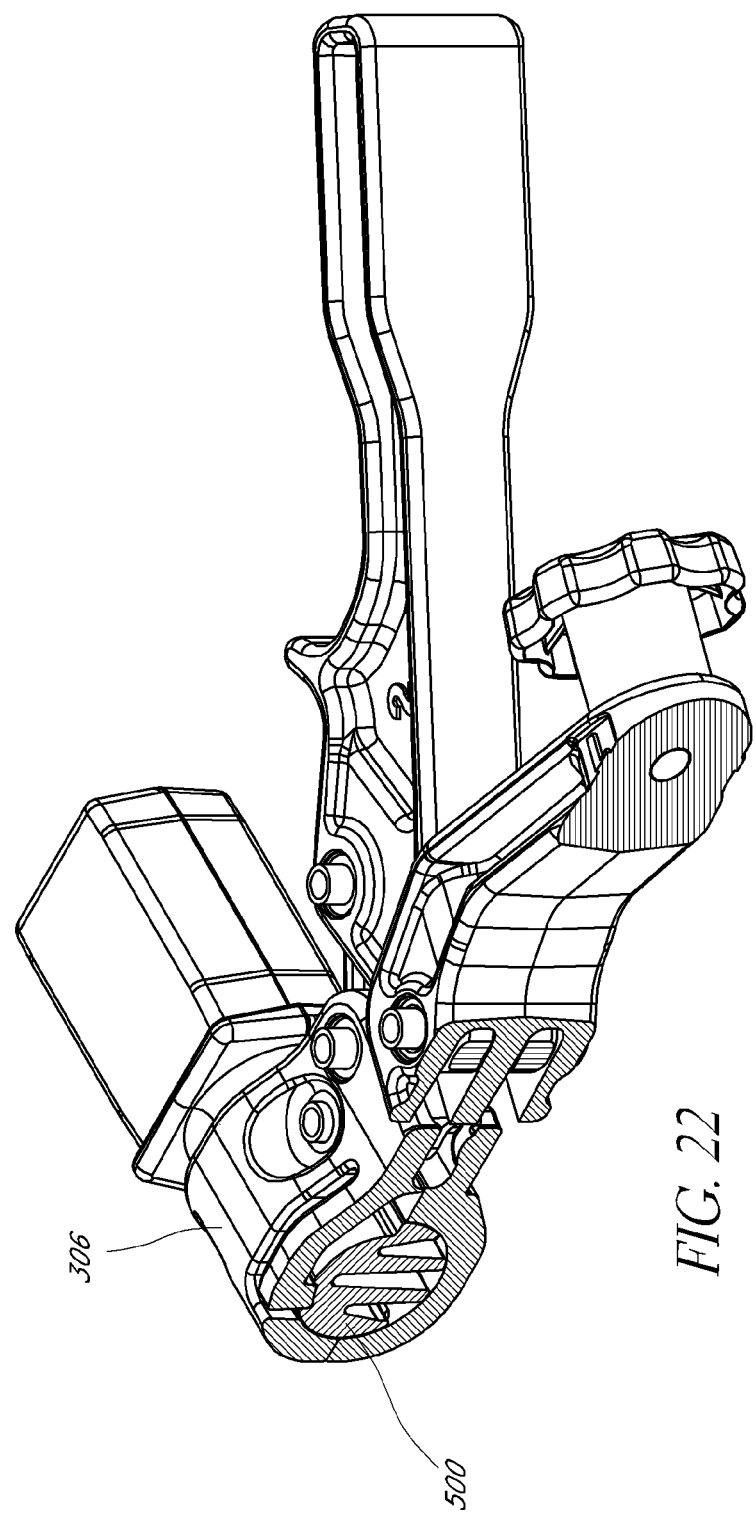
Figure 23:
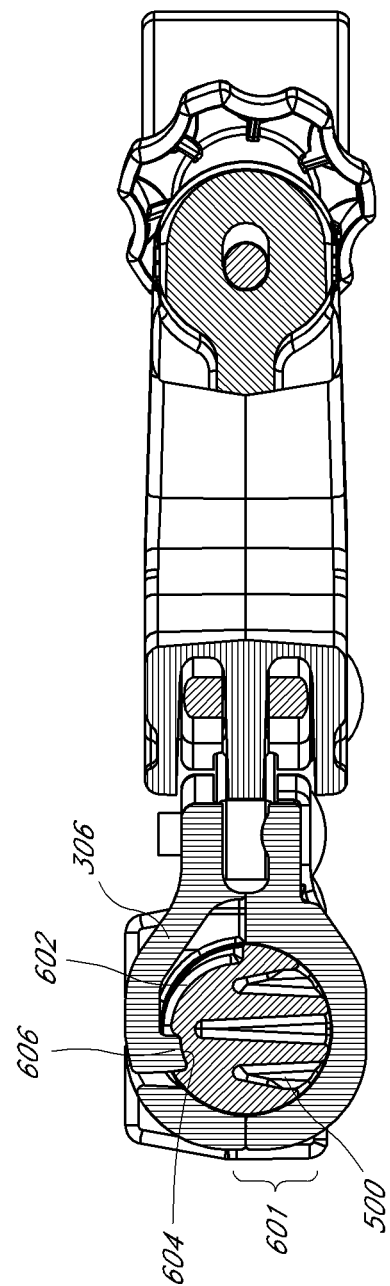

The connecting member 500 can have a generally circumferential slot 602 around the outside. At one end of the slot 602 can be a divot 604 extending into the center of the connecting member 500. The body 306 can include a tab 606 configured to reside in the slot 602. When the connecting member 500 is rotated to a maximum rotation, the tab 606 will be located within divot 604. This divot 604 can releasably hold the tab 606 so that the connecting member 500 will remain in the rotated position unless a force is applied to release the tab 606. In some embodiments, the tab 606 can be formed from a generally flexible material, though the type of material does not limit the disclosure. In some embodiments, the body 306 is configured to slightly bow outward to allow translation of the tab 606 within the slot 602. In some embodiments, the slot 602 can contain a plurality of divots 604, thereby allowing for mechanical stop points along the path of the slot 602. FIGS. 22-23 illustrate further cross-sectional viewpoints.

From the foregoing description, it will be appreciated that an inventive tonneau cover assembly and bow hanger are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A bow hanger for a tonneau cover having an outer perimeter, the bow hanger comprising:
   a hanger section comprising a body portion having a through aperture defining an axis along the through aperture, said hanger section having a first end facing the outer perimeter and a second end inward of the first end; and
   a clamp section comprising:
      an arm connected to the hanger section and extending generally in an outward direction;
      a rail retainer connected to an outward end of the arm, wherein the rail retainer is configured to exert an upward clamping force in a closed position; and
      a handle connected to the arm and the hanger section, the handle extending in an inward direction from the arm and the rail retainer;
      wherein actuation of the handle is configured to move the rail retainer between the clamped position and an unclamped position, the unclamped position having the rail retainer being located further from the axis and in an inward direction with respect to the hanger as compared to the clamped position.

2. The bow hanger of claim 1, wherein the hanger section further comprises a shaft extending through the through aperture of the body portion, the shaft comprising:
   a first attachment end configured to associate with a tonneau cover;
   a second attachment end opposite the first attachment end, the second attachment end configured to associate with a side rail; and
   a connecting portion extending between the first attachment end and the second attachment end.

3. The bow hanger of claim 2, wherein the shaft is rotatable within the through aperture.

4. The bow hanger of claim 3, wherein:
   the connecting portion comprises a circumferential slot; and
   the body portion comprises a tab configured to reside in the slot and translate along the slot when the shaft is rotated.

5. The bow hanger of claim 4, wherein the connecting portion further comprises a divot at an end of the circumferential slot, the divot configured to releasably retain the tab.

6. The bow hanger of claim 5, wherein the connecting portion comprises a plurality of divots located at different locations on the circumferential slot.

7. The bow hanger of claim 2, wherein the body portion is configured to slide along the shaft.

8. The bow hanger of claim 2, wherein the second attachment end is generally trapezoidal.

9. The bow hanger of claim 2, wherein the first attachment end is generally rectangular.

10. The bow hanger of claim 1, wherein the rail retainer including a screwable component for adjusting a vertical position of an end of the rail retainer.

11. The bow hanger of claim 10, wherein the end of the rail retainer comprises a flexible or pliable pad.

12. The bow hanger of claim 10, wherein the rail retainer comprises a cylindrical portion configured to mate with the arm, wherein loosening of the screwable component allows the cylindrical portion to be rotated with respect to the arm to a different vertical position.

13. The bow hanger of claim 1, wherein the arm is generally L-shaped.

14. The bow hanger of claim 1, wherein the handle extends in generally an outward direction and generally parallel to the axis in the closed position and generally away from the axis and in an outward direction in the open position.

15. The bow hanger of claim 2, further comprising a tonneau cover bow associated with the first attachment end.

16. The bow hanger of claim 15, further comprising a tonneau cover associated with the tonneau cover bow.

17. A tonneau cover assembly comprising:
- a tonneau cover;
- at least one side rail; and
- at least one bow hanger comprising:
    - a hanger section comprising a body portion having a through aperture defining an axis, said hanger section having a first end facing the at least one side rail and a second end inward of the first end, and a shaft, the body portion accepting the shaft which is configured to be associated with the at least one side rail and the at least one bow hanger; and
    - a clamp section comprising:
        - an arm connected to the hanger section and extending generally in an outward direction;
        - a rail retainer connected to an outward end of the arm, wherein the rail retainer is configured to exert an upward clamping force in a closed position; and
        - a handle connected to the arm and the hanger section, the handle extending in an inward direction from the arm and the rail retainer;
        - wherein actuation of the handle is configured to move the rail retainer between the clamped position and an unclamped position, the unclamped position having the rail retainer being located further from the axis and in an inward direction with respect to the hanger as compared to the clamped position.

* * * * *